United States Patent [19]

Freeman

[11] 4,052,692
[45] Oct. 4, 1977

[54] ACCENTUATOR CIRCUIT FOR UNDERWATER ACOUSTICAL DEVICES

[76] Inventor: Arthur W. Freeman, 525 E. Hastings St., Vancouver 4, B.C., Canada

[21] Appl. No.: 634,917

[22] Filed: Nov. 24, 1975

[51] Int. Cl.² ............................................. G01S 9/70
[52] U.S. Cl. ................................... 340/3 R; 340/3 F
[58] Field of Search ................................ 340/3 R, 3 F

[56] References Cited

U.S. PATENT DOCUMENTS

| 3,098,210 | 7/1963 | Sparling et al. | 340/3 R |
| 3,332,056 | 7/1967 | Drenkelfort | 340/3 R |
| 3,440,598 | 4/1969 | Drenkelfort et al. | 340/3 R |

Primary Examiner—Richard A. Farley
Attorney, Agent, or Firm—Woodling, Krost, Granger & Rust

[57] ABSTRACT

An accentuator circuit for underwater acoustical devices having a transmitter circuit and a receiver circuit each connected to underwater unit means which interchanges electrical signals and acoustical wave fronts in the water. The receiver circuit provides receiver outputs in accordance with distances traversed by the reflected wave fronts. The wave fronts reflecting from the bottom of the body of water produce a series of receiver outputs within an interval of time resulting in a bottom smear in the display in the prior art units. The invention includes an accentuator circuit connected to the receiver output comprising a series connected diode which substantially eliminates the bottom smear encountered by the prior art units enabling the resolution of an object which occurs within the aforesaid bottom smear. Consequently, objects such as fish which are located in close proximity to the bottom of the body of water can be readily detected.

13 Claims, 14 Drawing Figures

ACCENTUATOR CIRCUIT FOR UNDERWATER ACOUSTICAL DEVICES

BACKGROUND OF THE INVENTION

1. Field of the Invention

This invention relates to communications and more particularly to electrical echo systems for underwater use.

2. Description of the Prior Art

Echo systems such as fish finders and the like are well known to the art. These systems generally transmit a short pulse of acoustical energy into the body of water by a transmitter transducer. The transmitted acoustical wave front generally propagates in a spherical manner within a conical volume with the vertex of the cone being at the transmitter transducer and the base of the cone being the bottom of the body of water. The transmitted wave front expands within the conical volume as a function of distance and may cover a very large area on the bottom of the body of water and other objects are received by a receiver transducer which may be one and the same as the transmitter transducer or be a separate unit. The transmitted wave front reflecting from the bottom of the body of the water and other objects results in a series of reflected wave fronts. This series of reflected bottom wave fronts appears as an output commonly referred to as "bottom smear." The cone of investigation can include reflected pulses from fish and obstructions which are in front of the vessel in which the echo system is installed. Thus, the system may be used to warn of an impending obstruction to provide time for the vessel to avoid the obstruction. Since the transmitted acoustical wave front widens with distance from the transmitter transducer, an obstruction in front of the vessel will appear as an object immediately under the vessel, but, at a greater distance than the bottom. Accordingly, the obstruction will be lost within the bottom smear until it emerges as a rise in the bottom profile. Consequently, the early warning or the detection of objects in front of the vessel is totally eliminated.

Attempts to overcome such difficulties have centered around methods of utilizing the difference in amplitude between the relatively weak reflected wave fronts from fish and the stronger reflected wave fronts from the bottom, U.S. Pat. No. 3,440,598 discloses an apparatus wherein a grey line is interposed between the initial bottom reflected signal and the remainder of the bottom smear, whereas U.S. Pat. No. 3,098,210 discloses an apparatus wherein a white line is interposed between the initial bottom reflected signal and the remainder of the bottom smear. Other methods and apparatuses have included separate channels for the fish and bottom signals and the like. However, little attention has been directed to the fundamental problem of eliminating the obliterating bottom smears to resolve a signal which is located within the bottom smear.

Therefore, an object of this invention is to overcome the aforementioned disadvantages of the prior art grey line and white line apparatuses and provide a device for detecting an object in a body of water which eliminates the bottom smear caused by a series of reflected wave fronts from the bottom of the body of water.

Another object of this invention is to provide a device for detecting the presence of an object in a body of water which provides an output which is substantially independent of the continuance in time of the receiver output caused by a series of wave fronts reflecting from the bottom of the body of water.

Another object of this invention is to provide a device for detecting the presence of an object in a body of water whereby the wide bottom smear of the receiver output caused by the series of wave fronts reflecting from the bottom will appear as narrow bottom lines depending on the bottom strata, etc.

Another object of this invention is to provide a device for detecting the presence of an object in a body of water having an accentuator circuit for resolving a receiver output corresponding to the reception of a wave front reflecting from an object in the body of water which occurs within the time interval of the bottom smear encountered by the prior art units.

Another object of this invention is to provide a device for detecting the presence of an object in a body of water including means for establishing a threshold level for signals transfer whereby signals below the threshold level will be blocked whereas signals above the threshold level will be transferred to a display.

Another object of this invention is to provide a device for detecting the presence of an object in a body of water which is readily adaptable to existing echo systems and the like.

SUMMARY OF THE INVENTION

The invention may be incorporated into a circuit for an underwater device which detects the presence of an object in a body of water, comprising in combination, underwater unit means for interchanging electrical signals and acoustical wave fronts in the water, a transmitter circuit connected to said underwater unit means for transmitting an acoustical wave front through the water, a receiver circuit connected to said underwater unit means for providing receiver outputs in accordance with the distances traversed by said reflected wave fronts, the wave fronts reflected from the bottom of the body of water producing a series of receiver outputs within a time interval thereby obliterating a receiver output which occurs within said time interval corresponding to an object under investigation, and an accentuator circuit including threshold means connected in series with said receiver circuit for modifying said receiver outputs to substantially reduce the obliteration due to said series of receiver outputs to resolve said receiver output corresponding to the wave front reflecting from the object under investigation from said wave fronts reflecting from the bottom of the body of water.

Other objects and a fuller understanding of the invention may be held by referring to the following description and claims, taking in conjunction with the accompanying drawings.

DESCRIPTION OF THE PREFERRED EMBODIMENT

Figure 1:
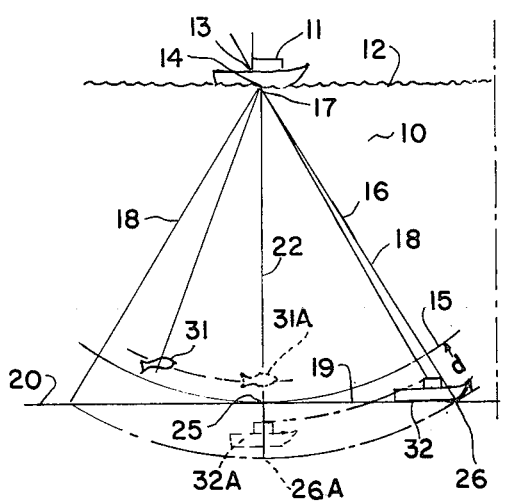
FIG. 1 is a side view showing the propagation of a transmitted acoustical wave front to the bottom of a body of water.

FIG. 1 is a side view of water 10 with a vessel 11 floating on the surface 12 of the water whih vessel 11 includes a device 13 for detecting the presence of an object in the water 10. The device 13 includes an underwater unit means 14 for transmitting a pulsed spherical acoustical wave front 15 through the water 10 in a volume defined by a cone 16. The vertex 17 of the cone 16 is located in proximity to the underwater unit means 14 with the lateral sides 18 of the cone defining a base 19 which is located on the bottom 20 of the body of water 10. In this embodiment the cone 16 is shown as a right cone of revolution with the axis 22 of the cone 16 being the minimum distance between the underwater unit means 14 and a first bottom point 25 of the bottom 20. The vertex angle of the cone has been exaggerated for the sake of clarity. A receiver circuit located on the vessel 11 is connected to the underwater unit means 14 for providing a receiver output in accordance with the distance traversed by reflected wave fronts. Those skilled in the art will appreciate the fact that the wave fronts reflecting from the bottom 20 of the body of water 10 produce a substantially continuous receiver output within a time interval beginning with the reception of a wave reflecting from the first bottom point 25. This substantially continuous receiver output results in a "bottom smear" on the display as well known to the art. This "bottom smear" is caused by many factors including multiple bottom reflections, reflections from bottom strata, reverberation and the like.

FIG. 1 illustrates a first and a second object shown as 31 and 32 which are located at different depths and offset from the axis 22. Since the echo system is sensitive only to the magnitude of the distance between the underwater unit 14 and the object, the first and second objects 31 and 32 have been shown along the axis 22 as phantom objects 31A and 32A. A second bottom point 26 has also been shown as a point 26A along the axis 22.

Figure 2:
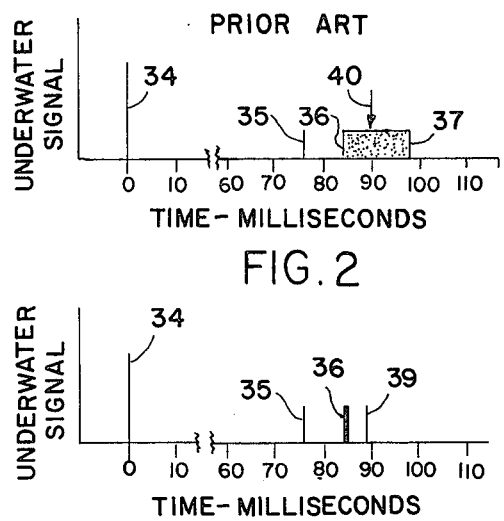
FIG. 2 is a graph of the underwater unit signals as a function of time for a prior art echo system.

FIG. 2 is a graph of the underwater unit signal as a function of time in milliseconds for a prior art echo system. At time ($t=0$), an acoustical wave front is transmitted from the underwater unit means 14 to propagate through the cone 16 as shown by pulse 34. Assuming that the acoustical wave front propagates at a speed of 4,700 feet per second in water, then a wave front reflecting from the first fish will produce a pulse 35 at 76 milliseconds. The first fish 31 will appear to be at a depth along the axis 22 of approximately 178 ft. A wave front reflecting from the first bottom point 25 will produce a first bottom pulse 36 at 84 milliseconds indicating the true depth of the body of water 10 to be 197 feet. This is the beginning of the "bottom smear" which extends for example to pulse 37 at 98 milliseconds which corresponds to the second bottom point 26.

The bottom smear between 84 and 98 milliseconds obliterates a reflected pulse from the second object 32 which occurs at 98 milliseconds, as shown by the arrow 40, which indicates the object to be at a depth of 209 feet. The object 32 will not be resolved in the display of the prior art circuit shown in FIG. 2.

Figure 3:
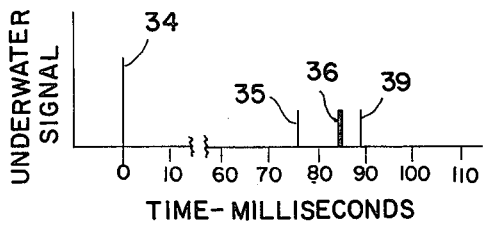
FIG. 3 is a graph of the underwater unit signals as a function of time for an echo system incorporating the instant invention under substantially the same signal conditions as the graph shown in FIG. 2.

FIG. 3 is a graph of the underwater unit signal as a function of time incorporating the invention under similar conditions as the graph in FIG. 2. FIG. 3 has been simplified to enable a better understanding of the invention but essentially the bottom smear between 84 and 98 milliseconds has been reduced, a narrow pulse 36 corresponding to the first bottom pulse occurring at 84 milliseconds. The invention eliminates the obliteration caused by the "bottom smear" to resolve the reflected pulse 39 from the second object 32 which occurs in the "bottom smear" of the prior art unit.

Figure 4:
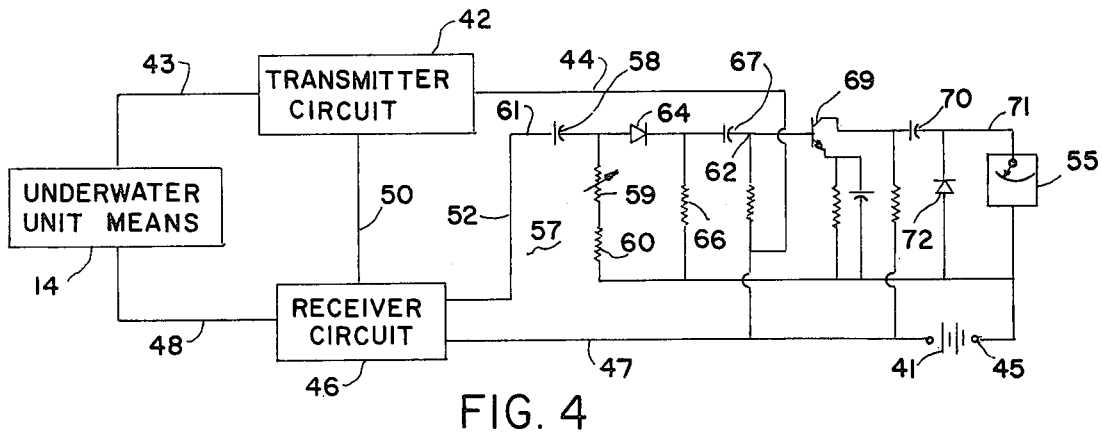
FIG. 4 is a circuit diagram of a device for detecting the presence of an object in a body of water which incorporates the instant invention.

FIG. 4 is a schematic diagram of a device for detecting the presence of an object in a body of water comprising power source means 41, underwater unit means 14 and a transmitter circuit 42 connecting the underwater unit means 14 to the power source means 41 by connectors 43 and 44. A receiver circuit 46 is connected to the power source means 41 by a connector 47 and is connected through a connector 48 to the underwater unit means 14 for providing an electrical signal in accordance with the reception of reflected acoustical wave fronts. Means shown as a connector 50 connects the transmitter circuit 42 to the receiver circuit 46 for determining the duration between the transmitted acoustical wave front and the reception of reflected wave fronts for providing a receiver output on connector 52 in accordance with the distances traversed by the reflected wave front. As previously explained in connection with FIG. 1-3, wave fronts reflecting from the bottom 20 of the body of water 10 produce a substantially continuous receiver output 38 within a time interval beginning with the reception of a wave front reflecting from the first bottom point 25 which is a minimum distance from the underwater unit means 14. A display 55 may optionally include a recording device that provides a permanent record of the time transmission or the depth from which reflection occurs for the reflected wave fronts. One method of recording the signals includes a time stylus traversing a paper with a voltage impressed on the stylus. The paper is burned in accordance with the potential on the stylus as the stylus moves across the paper. The reflected wave fronts produce darkened (burned) spots on the paper to indicate the presence and the depth of an object in the body of water. Other methods include multiple stylus arrangements, cathode ray tubes and the like. All of these types of display units are equally applicable to this invention.

An accentuator circuit 57 has an input 61 and an output 62 with threshold means shown as a solid state diode 64 connecting the receiver circuit 46 to the display 55. Capacitors 58 and 67 are connected in series with the diode 64 between the receiver circuit 46 and the display 55. The accentuator circuit 57 includes resistor means shown as potentiometer 59 and resistor 60 connecting the anode of diode 64 to a ground terminal 45 of the power source 41 and a resistor 66 connecting the cathode of diode 64 to the ground terminal 45 of the power source 41. The exact electrical operation of this accentuator circuit is not completely understood. However, it has been found that a value of 0.1 microfarad for capacitor 58 and 67; 1,000 ohms resistance for resistors 60 and 66; and 25,000 ohms resistance for potentiometer 59 gives optimum resolution of a pulse occurring within the "bottom smear". The potentiometer 59 may be considered a "smear control" which is adjusted for the optimum display of the reflected wave fronts. Too low a value causes smearing whereas too high a value intereferes with the control action of the circuit. The potentiometer 59 should be adjusted so that the "bottom smear" is eliminated in the display, leaving the individual echoes.

The threshold means for establishing a threshold level is shown as a semiconductor junction of diode 64. Signals below the threshold level are blocked whereas signals above the threshold level are passed to the display 55. The forward bias of the diode 64 provides the threshold level. Signals that are passed by the diode 64 are developed across the resistor 66 and are coupled through the capacitor 67. A transistor 69 amplifies the signals to a level sufficient to drive the display 55. The output of transistor 69 is transferred by coupling capacitor 70 and connector 71 to the display 55. Diode 72 operates as a direct current restorer.

Figure 5A:
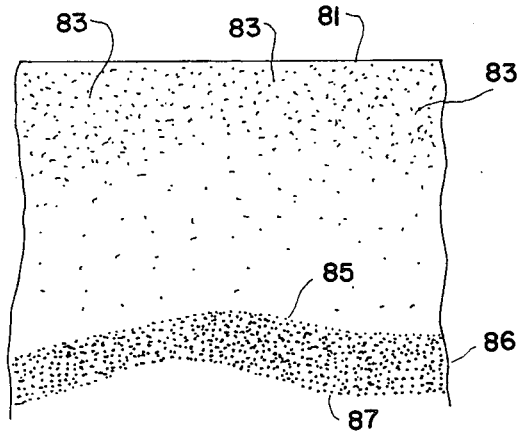
FIG. 5A is a graph of the display output of the device shown in FIG. 4 with the accentuation circuit being attenuated.

FIG. 5A is a reproduction of a display produced by the invention shown in FIG. 4, with the potentiometer 59 adjusted to a minimum level. The time of transmission of the acoustical wave front is shown by line 81 and imitates the surface of the water. Various objects 83 represent reflected wave fronts from fish located in the body of water. The first bottom pulse 36 in FIGS. 2 and 3 produces a line 85 to show the bottom contour. The bottom smear 86 extends substantially to a second line 87. Many objects are lost within the bottom smear 86.

Figure 5B:
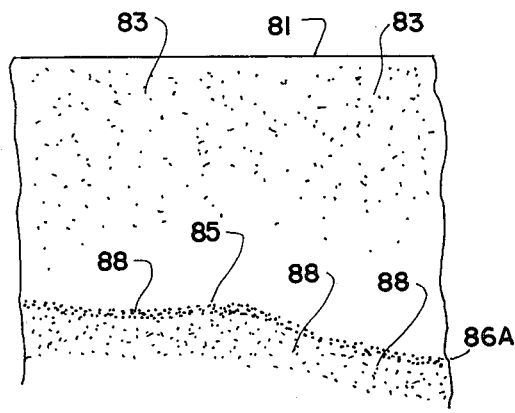
FIG. 5B is a graph of the display output under similar conditions as FIG. 5A with the accentuation circuit functioning.

FIG. 5B is a reproduction of a display produced by the invention in FIG. 4 under substantially the same operating conditions as FIG. 5A with the potentiometer 59 properly adjusted. The circuit tested had good reduction of the "bottom smear" at 5000 ohms and approaching total reduction of the "bottom smear" at 25,000 ohms. The "bottom smear" 86 in FIG. 5A has been reduced to a thin band 86A with objects 88 shown below the first bottom pulse line 85. Many objects that were obliterated within the bottom smear 86 are now clearly visible with the aid of the instant invention.

Figure 6:
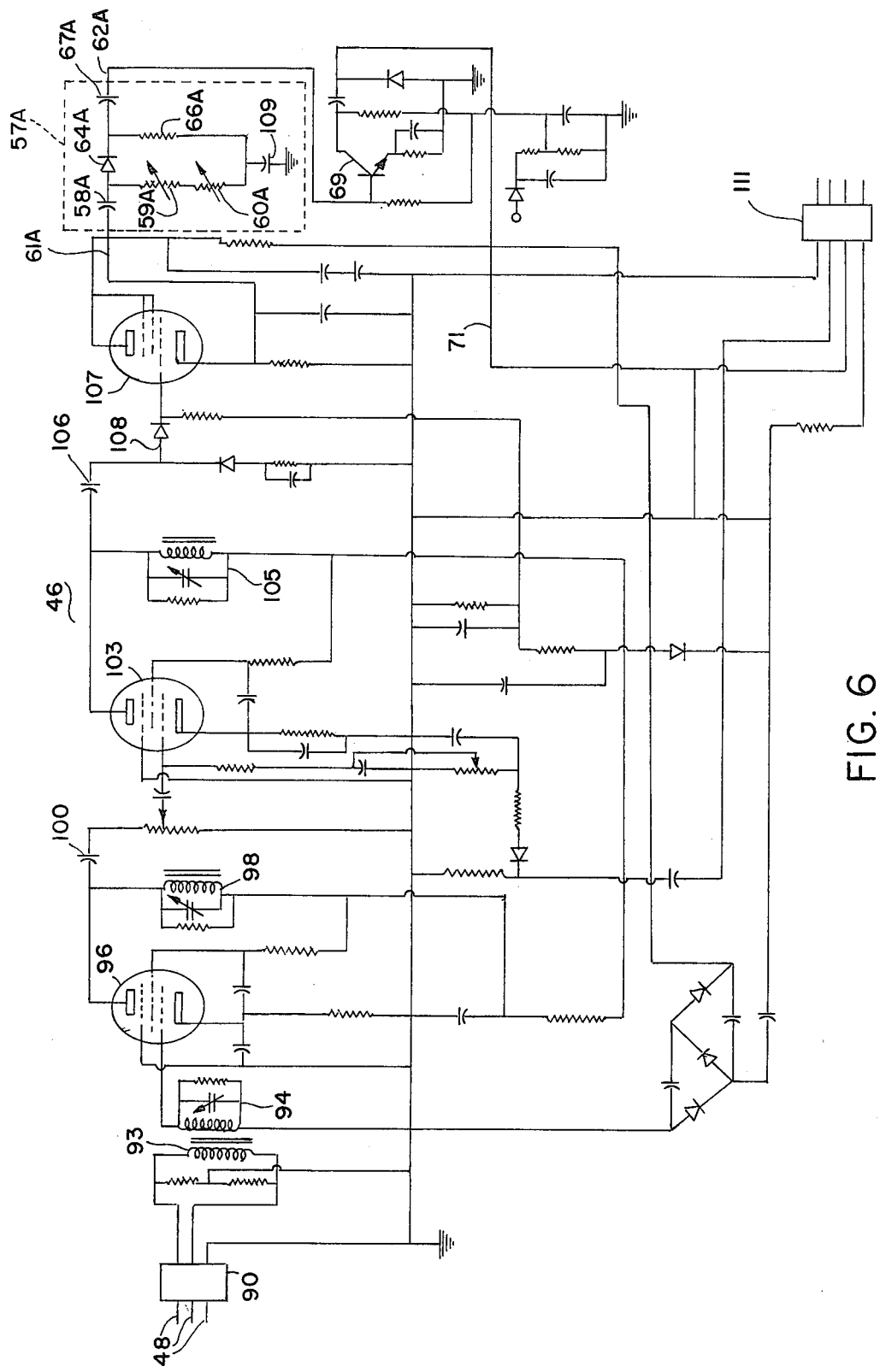
FIG. 6 is a schematic diagram of a device for detecting the presence of an object in a body of water incorporating the instant invention which is a variation of the circuit shown in FIG. 4.

FIG. 6 is a partial schematic diagram of the receiver circuit 46 shown in FIG. 4. The circuit includes a connection plug 90 for connection to connector 48 in FIG. 4. A transformer 93 connects the signal through a resonant circuit 94 to the grid of amplifier 96 as a pentode. Although the amplifier is shown as a vacuum tube, it is understood that the invention may be incorporated into solid state circuitry. The output of amplifier 96 is developed across a resonant circuit 98 and coupled through capacitor 100 to a second pentode amplifier 103. The various resistors and capacitors connected to the cathode and grid of amplifier 103 provide proper bias and filtering as well known in the art. The output of amplifier 103 is developed across a resonant circuit 105 and coupled by a capacitor 106 and a diode 108 as a detector to pass rectified positive pulses to a cathode follower circuit 107. The output of the cathode follower is connected to the input 61A of the accentuator circuit 57A.

The accentuator circuit 57A is a modification of the circuit shown in FIG. 4. Coupling capacitors 58A and 67A couple diode 64A between the output of the cathode follower 107 to the transistor circuit 69. In this embodiment potentiometer 59A and resistor 60A are connected to ground through a capacitor 109. Similarly, resistor 66A is connected through capacitor 109 to ground. The output 62A is connected through the connector 71 to a connection plug 111 which is connected to the display 55 shown in FIG. 4.

Figure 7A:
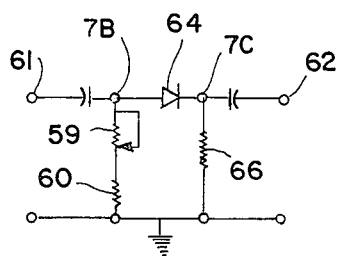
FIG. 7A is a schematic diagram of an accentuator circuit with a first setting of potentiometer 59.

FIG. 7A illustrates the accentuator circuit shown in FIG. 4, with the potentiometer 59 being adjusted such that the combined resistance of potentiometer 59 and resistor 60 equals the resistance of resistor 66; for example 1000 ohms.

Figure 7B:
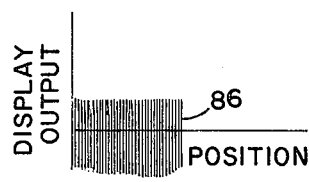
FIGS. 7B and 7C are wave forms from the circuit shown in FIG. 7A.

FIG. 7B shows the wave form present at point 7B in FIG. 7A before action by diode 64. The "bottom smear" 86 is present to an intolerable degree.

Figure 7C:
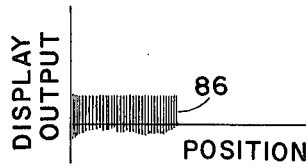

FIG. 7C shows the wave form present at point 7C in FIG. 7A after action by the diode 64. The "bottom smear" 86 has been reduced relative to FIG. 7B but is still present to an objectional degree. This wave form may be representative of the minimum resistance level of potentiometer 59.

Figure 8A:
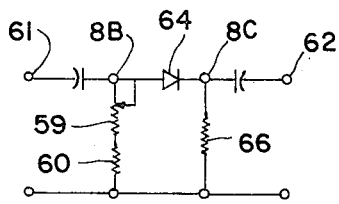
FIG. 8A is a schematic diagram of an accentuator circuit with a second setting of potentiometer 59.

FIG. 8A illustrates the accentuator circuit shown in FIG. 4 with the potentiometer 59 being adjusted to the preferred level such that the combined resistance of potentiometer 59 and resistor 60 equals approximately 26 times the resistance of resistor 66, for example 26,000 ohms. Under some conditions, a larger potentiometer may be required.

Figure 8B:
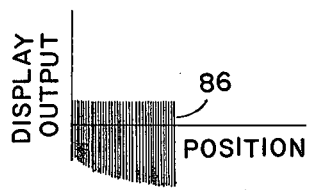
FIGS. 8B and 8C are wave forms from the circuit shown in FIG. 8A.

FIG. 8B shows the wave form present at point 8B in FIG. 8A prior to action by the diode 64. The "bottom smear" 86 is evident in FIG. 8B to a similar degree as FIG. 7B.

Figure 8C:
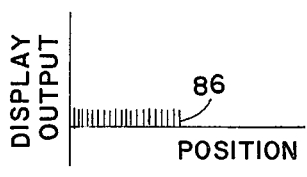

FIG. 8C shows the wave form present at point 8C in FIG. 8A after action by the diode 64. The "bottom smear" has been eliminated. This wave form is representative of the optimum resistance level of potentiometer 59 for a specific set of conditions of a body of water.

If diode 64 is shorted by a jumper wire the wave form shown in FIG. 8B will be present at point 8C in FIG. 8A illustrating the importance of diode 64.

Figure 9:
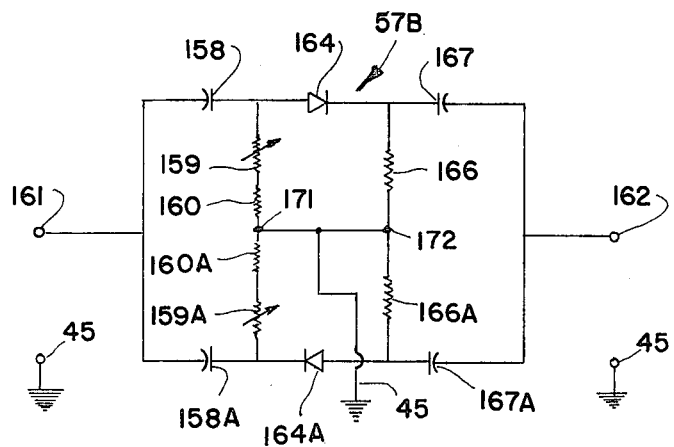
FIG. 9 is a modification of the accentuator circuit found in FIGS. 7A and 8A.

FIG. 9 is a modification 57B of the accentuator circuit shown in FIGS. 4 and 6. The accentuator circuit 57B has an input 161 and an output 162, relative to ground terminals 45. The threshold means of the accentuator circuit 57B includes first and second diode means 164 and 164A, first capacitor means 158 and 167 and second capacitor means 158A and 167A. The first capacitors 158 and 167 are connected in series with the first diode 164 to conduct current between input 161 and output 162. The second capacitors 158A and 167A are connected in series with the second diode 164A to conduct current between output 162 and input 161. First resistor means having a first resistor tap 171 interconnects the anode of the first diode 164 to the cathode of the second diode 164A. The first resistor means includes potentiometers 159 and 159A and resistors 160 and 160A. Second resistor means has a second resistor tap 172 and connects the cathode of the first diode 164 to the anode of the second diode 164A. The second resistor means comprises resistors 166 and 166A. The first and second resistor means comprises resistors 166 and 166A. The first and second resistor taps 171 and 172 are connected to ground 45.

In the preferred form of the instant accentuation circuit, capacitors 158, 158A, 167, and 167A have a value of 0.1 microfarads whereas resistors 160, 160A, 166, and 166A have a value of 1k Ω. Potentiometers 159 and 159A should be capable of producing a resistance level of 35kΩ. This circuit has been found to be extremely effective for eliminating the "bottom smear" in devices for detecting the presence of an object in a body of water.

The invention has been disclosed in specific form to teach the values of the components found therein in order to teach those skilled in the art how to practice the instant invention. The actual electrical operation of the circuit is not completely understood so the circuits have been described as specifically as possible to enable those skilled in the art to make and use the same, and enable others to develop theories of operation of the new improved accentuator circuit.

The present disclosure includes that contained in appended claims, as well as that of the foregoing description. Although this invention has been described in its preferred form, with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A circuit for an underwater device which detects the presence of an object in a body of water, comprising in combination:
   underwater unit means for interchanging electrical signals and acoustical wave fronts in the water;
   a transmitter circuit connected to said underwater unit means for transmitting an acoustical wave front through the water;
   a receiver circuit connected to said underwater unit means for providing receiver outputs in accordance with the distances traversed by said reflected wave fronts;
   the wave fronts reflecting from the bottom of the body of water producing a series of receiver outputs within a time interval thereby obliterating a receiver output which occurs within said time interval corresponding to an object under investigation;
   a detector connected to the output of said receiver circuit to have a detector output of one polarity;
   and an accentuator circuit including threshold means connected in series with said detector for modifying said receiver outputs to substantially reduce the obliteration due to said series of receiver outputs to resolve said receiver output corresponding to the wave front reflecting from the object under investigation from said wave fronts reflecting from the bottom of the body of water.

2. A circuit as set forth in claim 1, wherein said accentuator circuit includes means for varying the modification of said receiver output.

3. A circuit as set forth in claim 1, wherein said threshold means includes a solid state device having a forward voltage drop establishing at least part of a voltage threshold of said accentuator circuit.

4. A circuit as set forth in claim 3, wherein said solid state device includes a diode junction.

5. A circuit as set forth in claim 1, wherein said threshold means includes diode means connected to conduct signals above the forward voltage drop of said diode means and to block signals below the forward voltage drop of said diode means.

6. A circuit as set forth in claim 5, including a display for displaying the presence of an object in a body of water;
   and capacitor means connecting said diode means to said display.

7. A circuit as set forth in claim 6, including resistor means connected across said diode means.

8. A circuit as set forth in claim 7, wherein said resistor means includes variable resistor means.

9. A circuit as set forth in claim 1, wherein said accentuator circuit includes an input and an output relative to a ground;
   said threshold means including diode means;
   said threshold means including diode means;
   capacitor means connected in series with said diode means between said input and said output;
   a first and a second resistor connecting respectively a first and a second end of said diode means to said ground;
   and said first resistor being at least 10 times greater in resistance than said second resistor.

10. A circuit as set forth in claim 1, wherein said accentuator circuit includes an input and an output relative to a ground;
    said threshold means including first and second diode means;
    first and second capacitor means;
    means connecting said first capacitor means and said first diode means between said input and said output to conduct current in a first direction;
    means connecting said second capacitor means and said second diode means between said input and said output to conduct current in a second direction;
    first resistor means having a first resistor tap connecting the anode of said first diode means to the cathode of said second diode means;
    second resistor means having a second resistor tap connecting the cathode of said first diode means to the anode of said second diode means;
    means connecting said first and second resistor taps to said ground;
    and said first resistor means having a value which is at least 10 times greater than said second resistor means.

11. A circuit as set forth in claim 10, wherein said first resistor means is approximately twenty-six times the value of said second resistor means.

12. A circuit as set forth in claim 1, wherein said accentuator circuit includes first and second resistors and a coupling capacitor,
    said threshold means includes a diode,
    said coupling capacitor connecting said detector to said first resistor,
    means connecting said diode and second resistor in series across said first resistor to form a resistor-diode network,
    and said first resistor having a resistive value exceeding that of said second resistor to establish the RC time constant of said capacitor and resistor-diode network in the non-conducting direction of the diode in the order of 1 to 50 times the RC time constant in the forward conducting direction of the diode.

13. A circuit as set forth in claim 12, wherein said diode is connected to conduct signals of the same polarity of the signals passed by said detector.

* * * * *

UNITED STATES PATENT AND TRADEMARK OFFICE
CERTIFICATE OF CORRECTION

PATENT NO. : 4,052,692

DATED : October 4, 1977

INVENTOR(S) : Arthur W. Freeman

It is certified that error appears in the above-identified patent and that said Letters Patent are hereby corrected as shown below:

IN THE SPECIFICATION:

Column 4, line 11, delete "98" and insert --89--.

IN THE CLAIMS:

Column 8, Claim 9, delete line 14 "said threshold means including diode means;".

Signed and Sealed this

Twenty-first Day of February 1978

[SEAL]

Attest:

RUTH C. MASON
Attesting Officer

LUTRELLE F. PARKER
Acting Commissioner of Patents and Trademarks